United States Patent
Citu et al.

(10) Patent No.: US 9,262,045 B1
(45) Date of Patent: Feb. 16, 2016

(54) DYNAMIC IMAGE DISPLAY

(71) Applicant: Vendio Services, Inc., San Mateo, CA (US)

(72) Inventors: Gheorghe Adrian Citu, Bucharest (RO); Razvan Vlad Lazar, Bucharest (RO); Christina Kaing Liu, Burlingame, CA (US); Christian Andrew Williams, San Mateo, CA (US); Valentin Bucsa, Bucharest (RO)

(73) Assignee: Vendio Services, Inc., San Mateo, CA (US)

( * ) Notice: Subject to any disclaimer, the term of this patent is extended or adjusted under 35 U.S.C. 154(b) by 347 days.

(21) Appl. No.: 13/753,412

(22) Filed: Jan. 29, 2013

Related U.S. Application Data

(60) Continuation of application No. 11/754,939, filed on May 29, 2007, now abandoned, which is a division of application No. 11/394,366, filed on Mar. 29, 2006, now abandoned.

(60) Provisional application No. 60/665,856, filed on Mar. 29, 2005.

(51) Int. Cl.
*G06F 3/00* (2006.01)
*G06F 3/0481* (2013.01)
*G06F 3/0484* (2013.01)

(52) U.S. Cl.
CPC .......... *G06F 3/04817* (2013.01); *G06F 3/0484* (2013.01)

(58) Field of Classification Search
CPC ...................................... G06F 3/0481–3/40484
See application file for complete search history.

(56) References Cited

U.S. PATENT DOCUMENTS

| | | | |
|---|---|---|---|
| 5,241,671 A * | 8/1993 | Reed et al. | |
| 5,491,795 A * | 2/1996 | Beaudet et al. | 715/804 |
| 5,517,605 A * | 5/1996 | Wolf | |
| 5,546,529 A * | 8/1996 | Bowers et al. | 715/848 |
| 5,677,708 A * | 10/1997 | Matthews et al. | 348/E5.104 |
| 5,796,945 A * | 8/1998 | Tarabella | 709/219 |
| 5,842,218 A * | 11/1998 | Robinson | |
| 5,870,770 A * | 2/1999 | Wolfe | 715/805 |
| 5,877,766 A * | 3/1999 | Bates et al. | 715/854 |
| 5,943,679 A * | 8/1999 | Niles et al. | 715/247 |
| 5,970,471 A * | 10/1999 | Hill | 705/26.8 |
| 5,982,369 A * | 11/1999 | Sciammarella et al. | 715/835 |
| 6,008,803 A * | 12/1999 | Rowe et al. | 348/E5.105 |
| 6,025,843 A * | 2/2000 | Sklar | 715/841 |
| 6,025,844 A * | 2/2000 | Parsons | 715/805 |
| 6,038,560 A * | 3/2000 | Wical | |
| 6,070,176 A * | 5/2000 | Downs et al. | 715/234 |

(Continued)

*Primary Examiner* — Steven B Theriault
(74) *Attorney, Agent, or Firm* — Shiells Law Firm, P.C.

(57) ABSTRACT

A plurality of indicia are downloaded during the rendering of a web page retrieved from a server. Each of the indicia corresponds to a respective one of a plurality of text entries in a database in communication with such server or any other server on the network. A predetermined number of the downloaded indicia are then displayed in a first region of a web page. One of the indicia currently displayed at a selected location within the first region is visually enhanced. Next, the respective one of the text entries corresponding to the indicia that has been enhanced at the selected location in the first region is downloaded and then displayed in a second region of the web page. So that all such indicia are displayed, each one of the indicia currently displayed in the first region is replaced with another one of the indicia not currently displayed in the first region.

20 Claims, 3 Drawing Sheets

(56) References Cited

U.S. PATENT DOCUMENTS

| | | | |
|---|---|---|---|
| 6,085,187 A * | 7/2000 | Carter et al. | |
| 6,112,201 A * | 8/2000 | Wical | |
| 6,119,135 A * | 9/2000 | Helfman | 715/206 |
| 6,160,554 A * | 12/2000 | Krause | 715/804 |
| 6,169,992 B1 | 1/2001 | Beall et al. | |
| 6,181,342 B1 * | 1/2001 | Niblack | 345/635 |
| 6,226,655 B1 * | 5/2001 | Borman et al. | 715/207 |
| 6,252,597 B1 * | 6/2001 | Lokuge | 715/841 |
| 6,256,028 B1 * | 7/2001 | Sanford et al. | 715/841 |
| 6,262,722 B1 * | 7/2001 | Allison et al. | 725/39 |
| 6,266,058 B1 * | 7/2001 | Meyer | 715/733 |
| 6,271,840 B1 * | 8/2001 | Finseth et al. | 715/236 |
| 6,278,452 B1 * | 8/2001 | Huberman et al. | 715/764 |
| 6,278,991 B1 * | 8/2001 | Ebert | |
| 6,281,940 B1 * | 8/2001 | Sciammarella | 348/564 |
| 6,301,576 B1 * | 10/2001 | Wolfe | |
| 6,304,259 B1 * | 10/2001 | DeStefano | 715/805 |
| 6,307,573 B1 * | 10/2001 | Barros | 715/764 |
| 6,310,633 B1 * | 10/2001 | Graham | 715/839 |
| 6,311,194 B1 * | 10/2001 | Sheth et al. | 715/236 |
| 6,337,694 B1 * | 1/2002 | Becker et al. | 345/684 |
| 6,341,280 B1 * | 1/2002 | Glass et al. | 707/754 |
| 6,342,902 B1 * | 1/2002 | Harradine et al. | 715/716 |
| 6,344,880 B1 * | 2/2002 | Takahashi et al. | 348/563 |
| 6,348,935 B1 * | 2/2002 | Malacinski et al. | 715/853 |
| 6,356,899 B1 * | 3/2002 | Chakrabarti et al. | 707/737 |
| 6,374,260 B1 * | 4/2002 | Hoffert et al. | |
| 6,385,619 B1 * | 5/2002 | Eichstaedt et al. | 707/748 |
| 6,405,192 B1 * | 6/2002 | Brown et al. | 707/722 |
| 6,421,070 B1 * | 7/2002 | Ramos et al. | 715/763 |
| 6,490,602 B1 * | 12/2002 | Kraemer | 715/236 |
| 6,496,842 B1 * | 12/2002 | Lyness | 715/206 |
| 6,515,656 B1 * | 2/2003 | Wittenburg et al. | 345/418 |
| 6,535,888 B1 * | 3/2003 | Vijayan et al. | 707/706 |
| 6,571,390 B1 * | 5/2003 | Dunn et al. | 725/52 |
| 6,578,078 B1 * | 6/2003 | Smith et al. | 709/224 |
| 6,594,670 B1 * | 7/2003 | Genser | |
| 6,598,054 B2 * | 7/2003 | Schuetze et al. | |
| 6,613,100 B2 * | 9/2003 | Miller | 715/273 |
| 6,625,609 B1 * | 9/2003 | McDade et al. | |
| 6,647,534 B1 * | 11/2003 | Graham | 715/205 |
| 6,665,838 B1 * | 12/2003 | Brown et al. | 715/205 |
| 6,678,891 B1 * | 1/2004 | Wilcox et al. | 725/42 |
| 6,734,883 B1 * | 5/2004 | Wynn et al. | 715/830 |
| 6,760,746 B1 * | 7/2004 | Schneider | 709/203 |
| 6,768,999 B2 * | 7/2004 | Prager et al. | 707/999.002 |
| 6,862,598 B2 * | 3/2005 | Higashigawa | 707/797 |
| 6,864,904 B1 * | 3/2005 | Ran et al. | 715/760 |
| 6,915,489 B2 * | 7/2005 | Gargi | 715/790 |
| 6,966,037 B2 * | 11/2005 | Fredriksson et al. | 715/830 |
| 7,003,736 B2 * | 2/2006 | Kanevsky et al. | 715/837 |
| 7,039,879 B2 * | 5/2006 | Bergsten et al. | 715/853 |
| 7,051,289 B1 * | 5/2006 | Yoshida | 715/784 |
| 7,053,951 B2 * | 5/2006 | Miller et al. | 348/333.05 |
| 7,054,870 B2 * | 5/2006 | Holbrook | |
| 7,062,453 B1 * | 6/2006 | Clarke | 705/26.3 |
| 7,065,520 B2 * | 6/2006 | Langford | 707/769 |
| 7,107,532 B1 * | 9/2006 | Billmaier et al. | 715/720 |
| 7,127,414 B1 * | 10/2006 | Awadallah et al. | 705/26.8 |
| 7,152,210 B1 * | 12/2006 | Van Den Hoven et al. | 715/723 |
| 7,159,176 B2 * | 1/2007 | Billmaier et al. | 715/720 |
| 7,159,177 B2 * | 1/2007 | Billmaier et al. | 715/720 |
| 7,174,513 B1 * | 2/2007 | Nickum | 715/738 |
| 7,177,948 B1 * | 2/2007 | Kraft et al. | 709/246 |
| 7,228,492 B1 * | 6/2007 | Graham | 715/234 |
| 7,281,199 B1 * | 10/2007 | Nicol et al. | 715/203 |
| 7,296,033 B1 * | 11/2007 | Lynch | |
| 2002/0033848 A1 * | 3/2002 | Sciammarella et al. | 345/838 |
| 2002/0038299 A1 * | 3/2002 | Zernik et al. | 707/3 |
| 2002/0054157 A1 * | 5/2002 | Hayashi et al. | 345/838 |
| 2002/0078095 A1 * | 6/2002 | Culham | 707/516 |
| 2002/0087431 A1 * | 7/2002 | Morishima | 705/26 |
| 2002/0089549 A1 * | 7/2002 | Munro et al. | 345/835 |
| 2002/0091739 A1 * | 7/2002 | Ferlitsch et al. | 707/526 |
| 2002/0126155 A1 * | 9/2002 | Lin-Hendel | 345/785 |
| 2002/0135621 A1 * | 9/2002 | Angiulo et al. | 345/838 |
| 2002/0154162 A1 * | 10/2002 | Bhatia et al. | 345/745 |
| 2002/0163545 A1 * | 11/2002 | Hii | 345/838 |
| 2002/0167550 A1 * | 11/2002 | Eggen et al. | 345/838 |
| 2003/0043212 A1 * | 3/2003 | Kremer | 345/838 |
| 2003/0046693 A1 * | 3/2003 | Billmaier et al. | 725/39 |
| 2003/0046694 A1 * | 3/2003 | Istvan et al. | 725/39 |
| 2003/0046700 A1 * | 3/2003 | Wilcox et al. | 725/60 |
| 2003/0067481 A1 * | 4/2003 | Chedgey et al. | 345/738 |
| 2003/0081011 A1 * | 5/2003 | Sheldon et al. | 345/838 |
| 2003/0120779 A1 * | 6/2003 | Rodefer et al. | 709/225 |
| 2003/0146939 A1 * | 8/2003 | Petropoulos et al. | 345/810 |
| 2003/0146941 A1 * | 8/2003 | Bailey et al. | 345/830 |
| 2004/0054968 A1 * | 3/2004 | Savage | 715/513 |
| 2004/0100479 A1 * | 5/2004 | Nakano et al. | 345/700 |
| 2004/0199430 A1 * | 10/2004 | Hsieh | 705/26 |
| 2004/0205514 A1 * | 10/2004 | Sommerer et al. | 715/501.1 |
| 2004/0252119 A1 * | 12/2004 | Hunleth et al. | 345/440 |
| 2005/0114790 A1 * | 5/2005 | Dunbar et al. | 715/785 |
| 2005/0138570 A1 * | 6/2005 | Good et al. | 715/789 |
| 2005/0160375 A1 * | 7/2005 | Sciammarella et al. | 715/838 |
| 2005/0160376 A1 * | 7/2005 | Sciammarella et al. | 715/838 |
| 2005/0160377 A1 * | 7/2005 | Sciammarella et al. | 715/838 |
| 2005/0197893 A1 * | 9/2005 | Landau et al. | 705/14 |
| 2005/0210410 A1 * | 9/2005 | Ohwa et al. | 715/821 |
| 2005/0210416 A1 * | 9/2005 | MacLaurin et al. | 715/851 |
| 2006/0036950 A1 * | 2/2006 | Himberger et al. | 715/732 |
| 2006/0069998 A1 * | 3/2006 | Artman et al. | 715/721 |
| 2006/0136246 A1 * | 6/2006 | Tu | 705/1 |
| 2006/0218591 A1 * | 9/2006 | Billmaier et al. | 725/52 |
| 2006/0268100 A1 * | 11/2006 | Karukka et al. | 348/14.01 |
| 2007/0022020 A1 * | 1/2007 | Bernstein | 705/26 |
| 2007/0061748 A1 * | 3/2007 | Hirose | 715/764 |
| 2007/0174790 A1 * | 7/2007 | Jing et al. | 715/838 |
| 2007/0234196 A1 * | 10/2007 | Nicol et al. | 715/501.1 |

\* cited by examiner

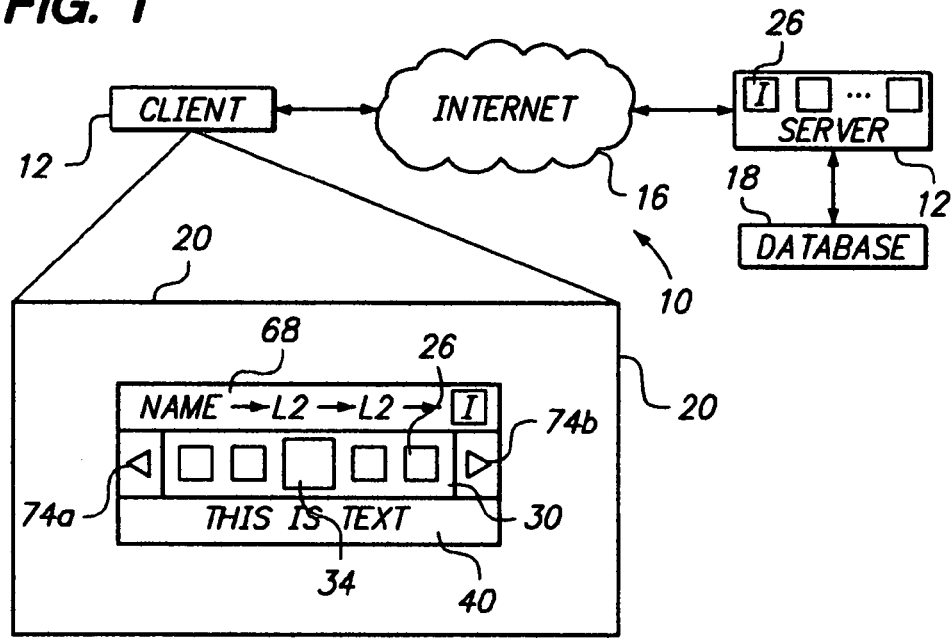
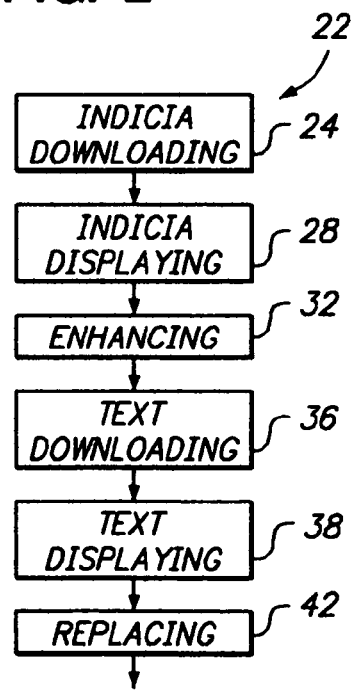
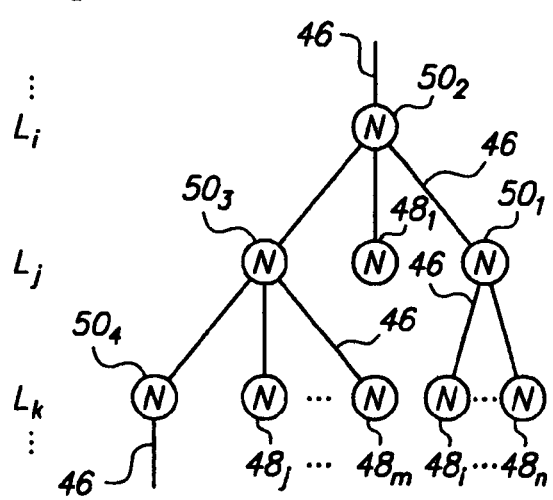

DYNAMIC IMAGE DISPLAY

RELATED APPLICATION DATA

The present invention is a continuation of and claims priority from co-pending application Ser. No. 11/754,939, filed May 29, 2007, which is a divisional of and claims priority from application Ser. No. 11/394,366, filed Mar. 29, 2006, now abandoned, which claims priority from U.S. Provisional Application No. 60/665,856, filed Mar. 29, 2005, the contents of all of which are incorporated herein by reference.

BACKGROUND OF THE INVENTION

1. Field of the Invention

The present invention relates generally to graphic user interfaces and more particularly to a novel interactive display that facilitates the viewing and retrieval of information stored in a database.

2. Description of the Related Art

A graphic user interface enables a user of a computer to perform tasks that require execution of code on such computer without knowing the details of the underlying code or even having any programming skills. A web browser is one such implementation of a graphic user interface that allows users of diverse skill sets to access and retrieve information stored at various locations on the Internet. It is because of the web browser that the Internet has come into common use for research, education and commerce.

Of particular interest herein are commercial applications wherein the user searches for items desired to be purchased. In connection therewith, the user may further seek to compare any such desired item with similar items varying, for example, in type, style or color, or further search for other items that may complement or be related to any such desired item.

To facilitate the browsing of such items, a web site for an online merchant may store the relative data for all items available in a database and further organize the database in a hierarchical category tree for user browsing. It is known to those skilled in the art that such hierarchical category trees can be used for any type of database and that the present invention as described herein is not limited to merchant applications exemplarily set forth herein.

A merchant database may include an inventory of all items available from such merchant, for example, bicycles and parts together with text descriptions for other relevant data for the inventory such as style, size and price. A hierarchical category tree, as displayed in the web browser, may have a top-level node displayed as a hyperlink with the text "All Items." Selection of the "All Items" link would next reveal individual categories at the immediately successive lower level of the category tree, such as "Bicycles" as one such category and "Parts" as another category. Further selection of "Bicycles" might then reveal categories of bicycles, such as "Touring," "Racing" and "Mountain." Further navigation to successive lower levels of the hierarchical tree will reveal additional category features, such as frame size and color, until a single item is displayed when the lowest level along the path taken through the category tree is reached.

The category tree can be displayed in a variety of ways, for example, as indented text in outline form, in a linear format wherein the text for each level is separated by a delimiter, or by pull down menu, or any combination of the above. The category tree itself may be dynamic and the category at each level restorable. Using the example above, to the frame size category may be repositioned to a higher level above the categories of touring, racing and mountain repositioned below.

Although such category trees are in common use on merchant websites, the user is faced with the task of negotiating one web page at a time through each level of the tree until a desired item is found. Furthermore, since the tree is displayed in the textual format when the user reaches the end of a branch path and the item displayed, such item may not be the exact item the user desired. Accordingly, there exists a need that provides a graphic navigation through a hierarchical category tree such that desired items may be readily found.

SUMMARY OF THE INVENTION

According to the present invention, a plurality of indicia are downloaded during the rendering of a web page retrieved from a server. Each of the indicia corresponds to a respective one of a plurality of text entries in a database in communication with such server or any other server on the network. A predetermined number of the downloaded indicia are then displayed in a first region of a web page. One of the indicia currently displayed at a selected location within the first region is visually enhanced. Next, the respective one of the text entries corresponding to the indicia that has been enhanced at the selected location in the first region is downloaded and then displayed in a second region of the web page. So that all such indicia are displayed, each one of the indicia currently displayed in the first region is replaced with another one of the indicia not currently displayed in the first region.

It is a feature of the present invention that the preselected number of indicia displayed advantageously gives a readily comprehensible overview of the database contents. It is a further feature of the present invention that the replacement of the indicia advantageously expands the scope of comprehension of the database.

In a particular embodiment of the present intention, each of the indicia can be a pictorial icon of an item described by the corresponding text entry in the database, which may further be arranged as hierarchical category tree for such items. Furthermore, each indicia may upon user selection retrieve from the database the text description for the item shown by its icon. When the indicia relate to a main item shown on the web page, the user may readily browse through the hierarchical tree of the categories and items in the database.

These and other objects, advantages and features of the present invention will become apparent to those skilled in the art from a study of the following Description of the Exemplary Preferred Embodiments when read in conjunction with the attached Drawing and appended Claims.

BRIEF DESCRIPTION OF THE DRAWING

FIG. 1 is a schematic block diagram of a typical network in which the present invention may be practiced;

FIG. 2 is a flowchart of an exemplary method practiced in accordance with the principles of the present invention;

FIG. 3 is a portion of a hierarchical category tree useful to describe certain aspects of the present invention;

DESCRIPTION OF THE EXEMPLARY PREFERRED EMBODIMENTS

Figure 4:
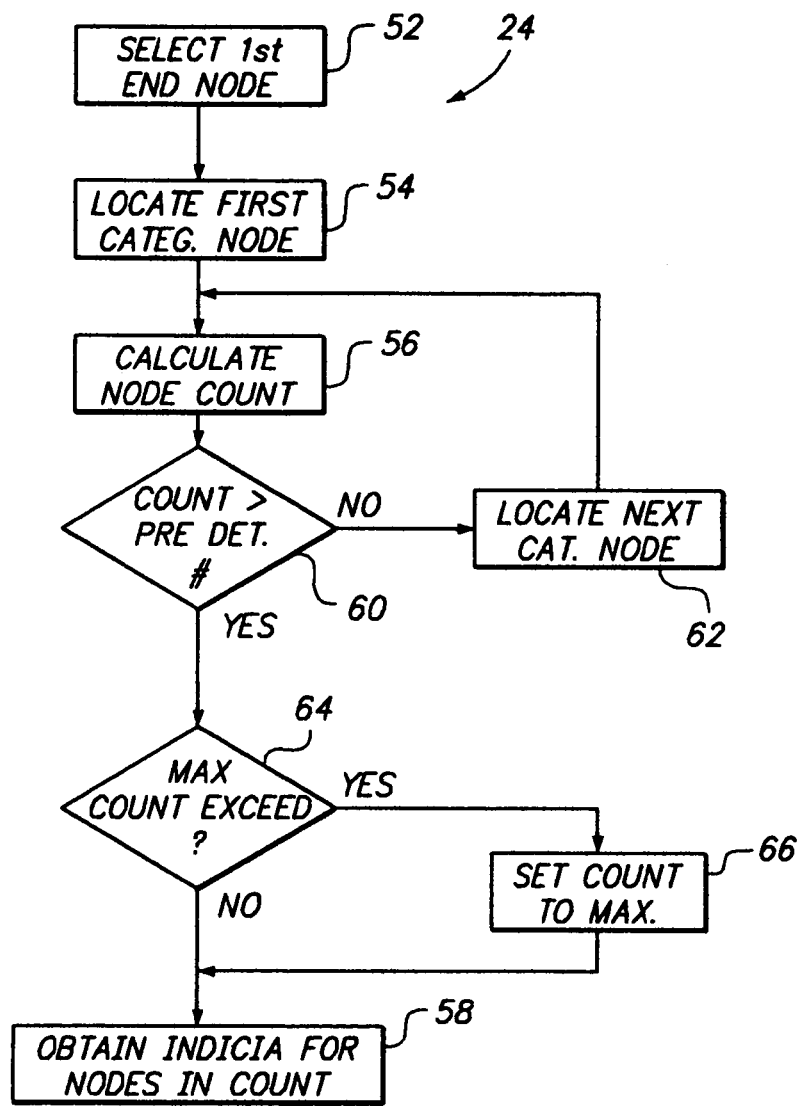
FIG. 4 is a flowchart of one embodiment of the indicia downloading step of FIG. 1.

Referring now to FIG. 1, there is shown a typical network system 10 including at least one server 12 and at least one client 14. The server 12 and client 14 may be connected to any type of local or wide area network. Exemplarily, such network may be the Internet 16, as best seen in FIG. 1. In data communication with the server 12 is a database 18.

As is well known in the art, the server 12 electronically stores on conventional computer readable medium the source for each of a plurality of web pages. The source for each of the web pages contains various tags defined by the protocol used for rendering the web pages at the client 14 and executable code, such as objects, scripts and applets. The objects, scripts and applets may further be retrievable from the server 12, or any other server connected to the network 16, in accordance with any tags, interfaces, calls or any other instruction contained in the source for each web page, as is well known.

Each web page is, as conventionally known, retrieved from the server 12 and the source served to the client 14 through the network 16 in response to a request initiated at the client 14. Upon receipt of the source for the requested web page at the client 14, the client 14 renders the source for such page for viewing in the graphic user interface, which may be a conventional web browser, running on the client 14. The web browser reads the tags in the source to render visually the web page, by formatting text and downloading any graphic objects from address locations specified by their respective tags. Any objects, scripts or applets that need to be retrieved are also downloaded to the client 14 and executed. Upon being visually rendered, the web browser displays, such as in an exemplarily web page 20, a variety of text and graphic information.

With further reference to FIG. 2, there is shown a flowchart 22 of an exemplary method of steps performed in accordance with the present invention. Each step of the method of the flowchart 22 may alternatively be implemented as a procedure implemented by executable code stored as the source of the web pages and also of the objects, scripts and applets referenced thereby.

As indicated at indicia downloading step 24, while rendering the source for the web page 20 at the client 14, a plurality of indicia 26 specified in a conventional manner in the source of the web page 20 are downloaded from the server 12 or any other server in the network 16 in accordance with the location of the indicia in the source specification. Each of the indicia 26 corresponds to a respective one of a plurality of text entries in the database 16. Exemplarily, each one of the text entries in the database 18 may be a description of an item and the corresponding one of the indicia 26 to such text entry and may then be a pictorial icon of such item.

Next, as indicated at indicia displaying step 28, a predetermined number of the downloaded indicia 26 are displayed in a first region 30 of the web page 20. As described in greater detail hereinbelow the number of indicia 26 retrieved by downloading step 24, in all cases when possible, meets or preferably exceeds the predetermined number of such indicia 26 displayed. The indicia 26 may further be, although not necessarily, disposed in a linear array within the first region 30 of the web page 20.

As indicated at enhancing step 32, one of the indicia 26 currently displayed at a selected location 34 in the first region 30 of the web page 20 is visually enhanced. In response to the enhancing step 32, the respective one of the text entries in the database 16 corresponding to the enhanced one of the indicia 26 at the selected location 34 is downloaded to the client 14, as indicated at text downloading step 36. Then as indicated at text displaying step 38, the downloaded text entry is displayed in a second region 40 of the web page 20.

As described above, the number of the indicia 26 downloaded to the client 14 preferably exceeds the predetermined number of such indicia 26 currently displayed in the first region of the web page 20. So that more of the downloaded indicia 26 may be subsequently displayed, each one of the indicia 26 currently displayed in the first region 30 is replaced with another one of the indicia 26 not currently displayed, as indicated by replacing step 42.

Furthermore, the replacing step 42 may be reiterative in that it may be any of intermittently, periodically, randomly or continuously performed or its procedures executed. After each iteration of the replacing step 42, the enhancing step 32, the text downloading step 36 and the text displaying step 38 are again performed so that the respective one of the text entries in the database 18 corresponding to the current one of the indicia 26 at the selected location 34 of the first region 30 is displayed in the second region 40 of the web page 40.

In the embodiment wherein the indicia 26 are icons of items in the database 18, as described above, a pictorial representation of the contents of the database 18 is readily perceived. As described further below, the indicia 26 provide yet another navigation tool to the database 18. Further embodiments and enhancements to the replacing step 42 are described below.

With further reference to FIG. 3, there is shown an exemplary hierarchical category tree 44, which is useful to describe the relationship between text entries stored in the database 18. The category tree is shown as having levels, $L_i$, $L_j$ and $L_k$, so as to be understood that any number of higher or lower levels may be present in the category tree 44 which abstracts the relationship of all text entries in the database 18.

At each level of the category tree 44, there is at least one node, N, and from each node, N, there is a branch 46 to at least one further node, N, at an immediately successive lower level until a node that terminates any branch path is reached. A branch path is a node to node path taken along each branch 46 as each level of the category tree 44 is traversed to the next immediately successive layer in a single direction.

It is to be understood that in the category tree 44 any branch path may terminate at any level. A node, such as node $48_1$, that terminates a branch path is herein referred to as an end node and all other nodes referred to as category nodes. Accordingly, at any level in the category tree 44 there can exist any number and combination of category nodes and end nodes.

Each of the text entries in the database 18, for which there is a respective one of the indicia 26, is stored at a corresponding end node of the category tree 44. In each category node there is stored a descriptor generic to the contents of each node in an immediately successive lower-level that has to branch 46 to such category node.

In one embodiment of the present invention, the indicia downloading step 24 downloads from the server 12 each of the indicia 26 corresponding to the respective one of the text entries from each end node in the category tree 44 wherein each end node has a branch to a common category node in an immediately higher level. For example, in FIG. 3, the end nodes $48_{i \ldots n}$, in level, $L_k$, all have a branch to the category node $50_1$ in the immediately higher level, $L_j$. Accordingly, the indicia 26 corresponding to the text entries associated with the nodes $48_{i \ldots n}$ are downloaded from the server 12.

In the event the number of end nodes terminating each branch path from the common category node is less than the predetermined number of indicia 26 to be displayed in the first region 30 of the web page 20, then, the indicia downloading step 24 further downloads from the server 12 each of the indicia corresponding to the respective one of the text entries from each end node that has a branch path to a common node in each successively higher one of the levels of the category tree 44 until the number of nodes at the selected one of the levels under the common category node at one of the successively higher one of the levels exceeds the predetermined number.

From the example above, should the number of the end nodes $48_{i\ldots n}$, and hence the number of indicia 26, not exceed the predetermined number of indicia to be displayed in the first region 30, the downloading procedure 24 would look to the next highest category node, in this example category node $50_2$, in level, $L_i$. From the category node $50_2$, the branch path would then be taken downward through category node $50_3$ until the sister end nodes to the end nodes $48_{i\ldots n}$, are located, these sister nodes exemplarily being the end nodes $48_{j\ldots m}$.

If the total number of end nodes now exceeds the predetermined number, the indicia downloading step 24 will now download the indicia 26 corresponding to the corresponding text entries in the end nodes $48_{i\ldots n}$, and $48_{j\ldots m}$. Otherwise the indicia downloading step 24 continues looking again to the next highest common category node.

Exemplarily, there also exist a further category node $50_4$ on level, $L_k$, that shares the common category node $50_3$ on the immediately successive higher level, $L_j$, with end nodes $48_{j\ldots m}$. Indicia corresponding to end nodes in any or all branch paths downward from the category node $50_4$ may also be downloaded in the same iteration as respecting end nodes $48_{j\ldots m}$.

Since the above reiteration of looking for successively higher category nodes could result in an inordinate amount of end nodes being located at any iteration, the indicia downloading step 24 may further be terminated upon a maximum number of the indicia being downloaded. Furthermore, the indicia downloading step 24 may be resumed to download further ones of the indicia 26 exceeding the maximum number in response to all of the indicia previously downloaded by the indicia downloading step 24 having been displayed by the replacing step 42.

Referring now to FIG. 4, there is shown one exemplary embodiment of the indicia downloading step 24. Initially, the indicia downloading step 24 commences, as indicated at step 52, with selecting a first end node, for example end node $48_i$. Next, as indicated at step 54, the first category node, such as category node $50_2$, is located on the immediately successive higher level on the branch path for the first end node selected in the selecting step 52. A count of each end node under the category node, in this example category node $50_2$, is then calculated, as indicated at step 56, and the indicia 26 for each respective one of the text entries associated with each end node, exemplarily end nodes $48_{i\ldots n}$ the count is obtained, as indicated at step 58.

In a further embodiment of the indicia downloading step 24, a determination may be made prior to the indicia obtaining step 58, whether the count obtained calculating step 56 exceeds the predetermined number of the indicia 26 to be displayed in the first region 30 of the web page 20. If this determination is positive, the indicia obtaining step 58 may next be performed. However, if this determination is negative, a second category node, in this example being category node $50_3$, is located in the branch path for the first end node, exemplarily end node $48_i$, the immediately successive higher level from the first category node, exemplarily category node $50_2$. The calculating step 56 is then performed with respect to all end nodes, exemplarily end nodes $48_{i\ldots n}$ and $48_{j\ldots m}$ to obtain the count.

In a further embodiment of the indicia downloading step 24, subsequent to the determination at step 60 whether the count exceeds the predetermined, another determination may be made, as indicated at step 64, whether the count exceeds a maximum count. If the determination is negative, then the indicia 26 may be obtained for the count as indicated at step 58. Otherwise if the determination is positive, the count is set to a maximum count, as indicated at step 66, prior to the indicia 26 being obtained at step 58.

Returning momentarily to FIG. 1, the web page 20 may further contain a third region 68. The third region 68 contains a linear text representation of the current branch path for the node corresponding to the present one of the indicia 26 in the selected location 34 in the first region 30 of the web page 20. The contents of each node in the linear text representation is separated by a delimiter. If the lowest level node represented by the linear textual representation is a category node, then this lowest level node may be represented by a pull down menu that contains the other nodes, whether category nodes or end nodes immediately below it in the category tree 44. The pull down menu may further notate the lower category nodes to indicate that yet further nodes exist below. Selection of any representation of a node separated by a delimiter or in a pull down menu will allow navigation through the category tree 44.

Regarding the enhancing step 32, the present one of the indicia 26 in the selected location 34 of the first region 30 may be displayed with enhanced visual prominence from each other of the indicia 26 currently in the first region 30. The enhanced visual prominence of the one of the indicia 26 in the selected location 34 may be an enlargement or highlighting of this particular one of the indicia 26.

Furthermore, the indicia 26 may be disposed in a linear array within the first region, with the selected location therein being the midpoint of the array. In such case, the predetermined number of indicia displayed in the first region 30 would be an odd number.

Figure 5:
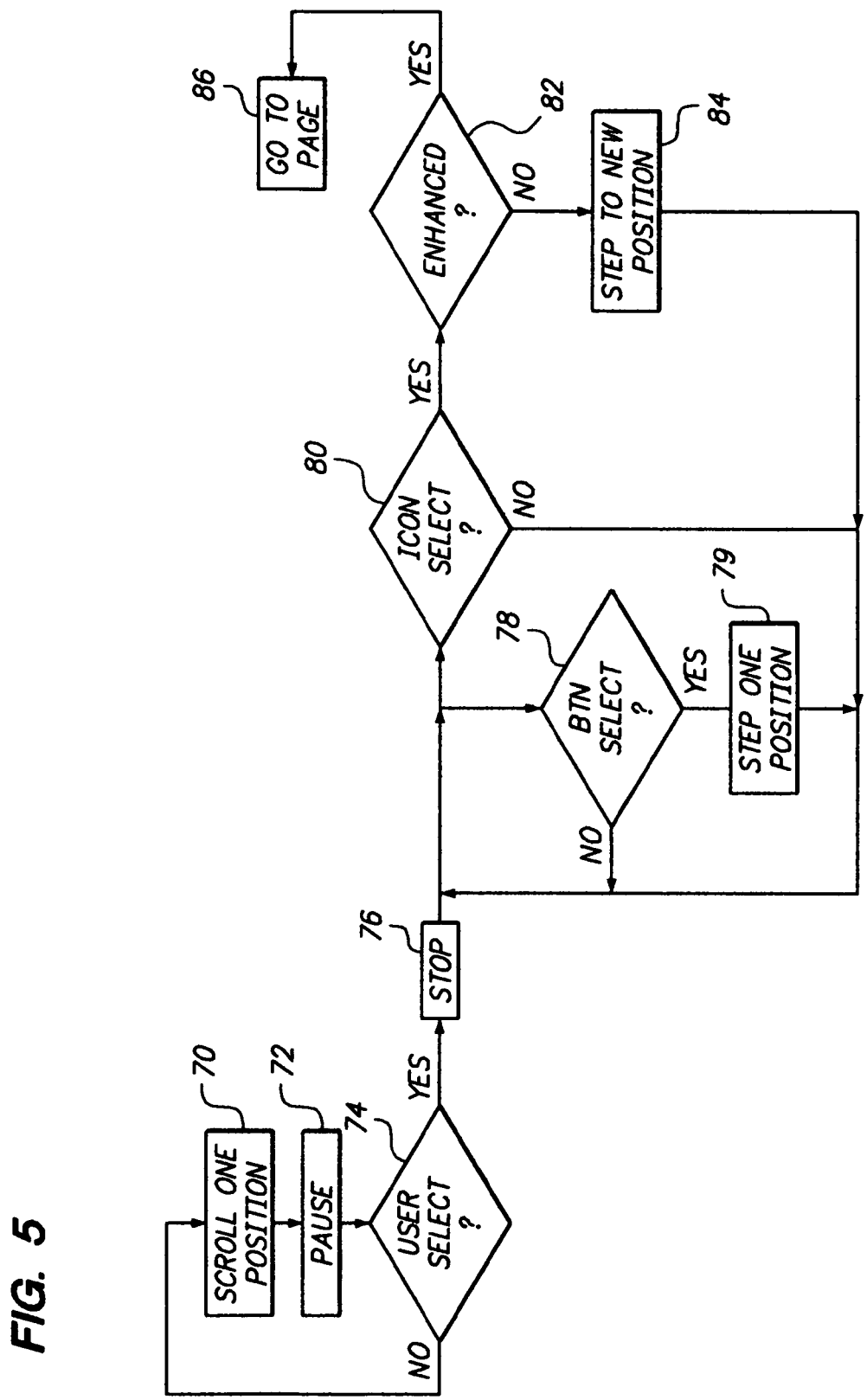
FIG. 5 is a flowchart of one embodiment of the replacing step of FIG. 1.

Referring now to FIG. 5, there is shown an exemplary embodiment of the replacing step 32. As indicated at step 70, each of the indicia 26 is scrolled in a queued linear array through the first region 30 of the web page 20. Preferably, as indicated at step 72, the queued linear array is momentarily paused upon each successive one of the indicia 26 being scrolled into the selected location 34 within the first region 30.

The scrolling step 70 commences automatically in response to completion of the indicia displaying step 28. Alternatively, to allow time for rendering of the web page 20, the scrolling step 70 may also commence upon expiration of the short time duration from completion of the indicia displaying step 28.

As best seen in FIG. 1, the web page 20 may further include a pair of arrow buttons 74a, 74b. Each of the arrow buttons 74a, 74b are preferably disposed on a respective and of the first region 30. A determination may then be made, as indicated at step 74, whether one of the buttons 74 has been selected. If the determination is negative, the scrolling of the queued linear array continues as indicated at scrolling step 70. Otherwise, if a button has been users selected, the replacing stepped 42 further includes the step of terminating the scrolling of the queued linear array is stopped, as indicated a step 76.

A determination may also be made, as indicated at step 78 whether one of the buttons 74a, 74b has been selected. If this determination is positive, then the queued linear array is, as indicated at 79, stepped one position in the direction of the pointer of the button 74a, 74b that was selected to reveal an additional one of the indicia 26. Otherwise this determination is negative, processing continues as indicated in FIG. 5.

It is to be noted that the decision made at step 74 also determines whether one of the indicia 26 has also been selected, and if so scrolling of the queued linear array is also terminated, as indicated at step 76. As processing continues from a negative determination made at step 78, a determination is made, as indicated at step 80 whether one of the indicia 26 in the second region 30 of the web page 20 has been selected. If this determination is negative, the processing continues awaiting further user action, as indicated in FIG. 5.

Otherwise, if the decision made at step 80 is positive, a further determination is made as indicated at step 82, whether the enhanced one of the indicia 26, in the selected location 34 of the first region 30, has been selected. If this determination is negative, the queued linear array is stepped, as indicated at step 84, such that the selected one of the indicia 26 is moved into the selected location 34 of the first region 30. Otherwise, if this determination is positive, a new web page associated with the enhanced one of the addition 26 may be opened in a new browser window, as indicated at step 86.

In addition to scrolling, the indicia 26 displayed in the first region 30 may also be presented in any one of numerous known techniques. For example, the indicia 26 could be displayed as playing cards, and the replacing step 42 would replace each card simulating, for example, playing cards being dealt. Another such embodiment would display the indicia 26 in the first-region 30 as indicia on the wheels of a slot machine. One of the above described buttons could act as the trigger for simulated slot machine wheels, which would then appear to randomly spend and stop displaying further ones of the indicia 26. Any such simulation can be presented in the web page 20 using known objects, such as Macromedia Flash™. objects.

There has been described hereinabove novel apparatus, methods and techniques for a dynamic image display. Those skilled in the art may now make numerous uses of, and departures from, the above described embodiments without departing from the inventive principles described herein. Accordingly, the present invention is to be defined solely by the lawfully permitted scope of the appended Claims.

What is claimed as the invention is:

1. An improved computerized merchandising system, the improvement comprising:
a non-transitory computer readable medium containing executable code that executes procedures of:
downloading from a server in network communication with a client during rendering a web page for display in a graphical user interface at said client a plurality of pictorial indicia corresponding to merchantable items, each of said indicia corresponding to a respective one of a plurality of text entries in a database in data communication with said server;
wherein each of one said plurality of text entries correlates to an end node of a category tree,
wherein each end node terminates its own branch path from a common category node of said category tree,
wherein if a count of a number of indicia is less than a predetermined number of indicia to be displayed in a first region of said web page:
said downloading further downloads from said server each of said indicia corresponding to respective one of said text entries from each end node that has a branch path to a common node in each successively higher one of a plurality of levels of said category tree,
until said count of said number of nodes at said selected one of said levels under said common category node at one of said successively higher one of said levels exceeds said predetermined number,
automatically displaying for a period of time unless otherwise directed by user input in said first region of said web page said predetermined number of said indicia in adjacent relationship to each other, said first region having a replacement-in location and a selected location for enhanced display of one of said indicia;
when one of said indicia is at said selected location, enhancing one of said indicia currently displayed at said selected location within said first region by enlarging said one of said indicia;
downloading from said database to said client said respective one of said text entries corresponding to said one of said indicia currently displayed at said selected location in said first region;
displaying in a second region of said web page a text entry corresponding to one of said indicia currently displayed at said selected location in said first region;
automatically after a period of time unless otherwise directed by user input, replacing one of said indicia currently displayed in said first region with an adjacent one of said indicia or, if there is no adjacent indicia, with one of said plurality of indicia downloaded from said server but not currently displayed at said replacement-in location in said first region;
automatically after a period of time unless otherwise directed by user input, replacing said one of said indicia at said selected location with an adjacent one of said indicia, said replaced one of said indicia then being displayed at another position adjacent to said selected location other than the position formerly occupied by said adjacent one of said indicia and reduced in size relative to its enlarged size at said selected location;
upon selection of said enhanced one of said indicia of an item by a user, displaying additional text entries corresponding to said indicia, and
a third region grouped with said first and second regions, said third region displaying information regarding one or more categories of said merchantable items and having a portion receiving user input to selectively display further pictorial indicia corresponding to a category of said merchantable items, as directed by user input.

2. An improved computerized merchandising system as set forth in claim 1 wherein at least one of said text entries is a description of an item including information relating to price and said corresponding one of said indicia is a pictorial icon of said item.

3. An improved computerized merchandising system as set forth in claim 1 wherein said displaying procedure displays said predetermined number of indicia in a single-file linear array.

4. An improved computerized merchandising system as set forth in claim 1 wherein said replacing procedure is reiterative selectively as random reiteration.

5. An improved computerized merchandising system as set forth in claim 4 wherein each of said enhancing procedure, downloading said text entries procedure and said displaying in said second region procedure are performed after each iteration of said replacing procedure.

6. An improved computerized merchandising system as set forth in claim 1 wherein said enhancing procedure displays said one of said indicia in said selected location with further enhanced visual prominence than each other of said indicia currently displayed in said first region.

7. An improved computerized merchandising system as set forth in claim 6 wherein said indicia are disposed in a linear array within said first region and said selected location is a midpoint of said array, said predetermined number being an odd number.

8. An improved computerized merchandising system as set forth in claim 6 wherein said enhanced visual prominence includes a highlighting of said one of said indicia.

9. An improved computerized merchandising system as set forth in claim 1 wherein said replacing procedure includes the procedures of: scrolling each said indicia in a queued linear array through first region; and pausing momentarily said queued linear array upon each successive one of said indicia being scrolled into said selected location.

10. An improved computerized merchandising system as set forth in claim 9 wherein said scrolling procedure commences automatically in response to completion of said indicia displaying procedure.

11. An improved computerized merchandising system as set forth in claim 10 wherein commencement of said scrolling procedure further occurs upon expiration of a selected time duration from completion of said indicia displaying procedure.

12. An improved computerized merchandising system as set forth in claim 11 wherein said first region further includes a pair of arrow buttons, each one of said arrow buttons being disposed on a respective end of said first region, and further wherein said replacing procedure further includes the procedure of terminating said scrolling procedure upon selection of one of said buttons.

13. An improved computerized merchandising system as set forth in claim 12 wherein said replacing procedure further includes stepping said queued linear array such that each of said indicia is repositioned to an immediately adjacent position in said first region upon selection of one of said buttons.

14. An improved computerized merchandising system as set forth in claim 13 wherein said queued linear array is stepped in a direction to reveal an additional one of said indicia in the pointer direction of one of said buttons.

15. An improved computerized merchandising system as set forth in claim 14 wherein said replacing procedure further includes the procedure of terminating said scrolling procedure upon selection of one of said indicia currently displayed in said first region.

16. An improved computerized merchandising system as set forth in claim 15 wherein said replacing procedure further includes stepping said queued linear array in a direction such that said selected one of said indicia is repositioned to said selected position in said first region in the event said selected one of said indicia is in a position other than said selected position upon selection thereof.

17. An improved computerized merchandising system as set forth in claim 15 wherein said replacing procedure further includes initiating a request for a further web page associated with said one of said indicia at said selected location in the event said selected one of said indicia is in said selected position upon selection thereof.

18. An improved computerized merchandising system as set forth in claim 1 wherein user selection of said second region initiates a request for a further web page associated with said one of said indicia at said selected location.

19. An improved method for navigation of a database of information regarding merchantable items in a graphic user interface of a computerized merchandising system that executes steps of:
downloading from a server in network communication with a client during rendering a web page for display in a graphic using interface at said client a plurality of pictorial indicia corresponding to merchantable items, each of said indicia corresponding to a respective one of a plurality of text entries in a database in data communication with said server;
wherein each of one said plurality of text entries correlates to an end node of a category tree,
wherein each end node terminates its own branch path from a common category node of the category tree,
wherein if a count of a number of indicia is less than a predetermined number of indicia to be displayed in a first region of the web page:
said downloading further downloads from said server each of said indicia corresponding to respective one of said text entries from each end node that has a branch path to a common node in each successively higher one of a plurality of levels of said category tree,
until said count of said number of nodes at said selected one of said levels under said common category node at one of said successively higher one of said levels exceeds said predetermined number,
automatically displaying for a period of time unless otherwise directed by user input in said first region of said web page said predetermined number of said indicia in adjacent relationship to each other, said first region having a replacement-in location and a selected location for enhanced display of one of said indicia;
when one of said indicia is at said selected location, enhancing said one of said indicia currently displayed at said selected location within said first region by enlarging said one of said indicia;
downloading from said database to said client said respective one of said text entries corresponding to said one of said indicia currently displayed at said selected location in said first region;
displaying in a second region of said web page a text entry corresponding to one of said indicia currently displayed at said selected location in said first region;
automatically after a period of time unless otherwise directed by user input, replacing one of said indicia currently displayed in said first region with an adjacent one of said indicia or, if there is no adjacent indicia, with one of said plurality of indicia downloaded from said server but not currently displayed in said first region at said replacement-in location;
automatically after a period of time unless otherwise directed by user input, replacing said one of said indicia at said selected location with an adjacent one of said indicia, said replaced one of said indicia then being displayed at another position adjacent to said selected location other than the position formerly occupied by said adjacent one of said indicia and reduced in size relative to its enlarged size at said selected location;
upon selection of said enhanced one of said indicia of an item by a user, displaying additional text entries corresponding to said indicia, and
a third region grouped with said first and second regions, said third region displaying information regarding one or more categories of said merchantable items and having a portion receiving user input to selectively display further pictorial indicia corresponding to a category of said merchantable items, as directed by user input.

20. An improved method for navigation of a database of information regarding merchantable items in a graphic user interface of a computerized merchandising system that executes steps of:
downloading from a server in network communication with a client during rendering a web page for display in a graphic using interface at said client a plurality of pictorial indicia corresponding to merchantable items, each of said indicia corresponding to a respective one of a plurality of text entries in a database in data communication with said server;

wherein each of one said plurality of text entries correlates to an end node of a category tree, wherein each end node terminates its own branch path from a common category node of said category tree, wherein if a count of a number of indicia is less than a predetermined number of indicia to be displayed in a first region of the web page:

said downloading further downloads from said server each of said indicia corresponding to respective one of said text entries from each end node that has a branch path to a common node in each successively higher one of a plurality of levels of said category tree, until said count of said number of nodes at the selected one of said levels under said common category node at one of said successively higher one of said levels exceeds said predetermined number, automatically displaying for a period of time unless otherwise directed by user input in said first region of said web page said predetermined number of said indicia in adjacent relationship to each other, said first region having a replacement-in location and a selected location for enhanced display of one of said indicia;

when one of said indicia is at said selected location, enhancing said one of said indicia currently displayed at said selected location within said first region by enlarging said one of said indicia;

downloading from said database to said client said respective one of said text entries corresponding to said one of said indicia currently displayed at said selected location in said first region;

displaying in a second region of said web page a text entry corresponding to one of said indicia currently displayed at said selected location in said first region;

automatically after a period of time unless otherwise directed by user input, replacing one of said indicia currently displayed in said first region with an adjacent one of said indicia or, if there is no adjacent indicia, with one of said plurality of indicia downloaded from said server but not currently displayed at said replacement-in location in said first region;

automatically after a period of time unless otherwise directed by user input, replacing said one of said indicia at said selected location with an adjacent one of said indicia, said replaced one of said indicia then being displayed at another position adjacent to said selected location other than the position formerly occupied by said adjacent one of said indicia and reduced in size relative to its enlarged size at said selected location;

upon selection of said enhanced one of said indicia of an item by a user, displaying additional text entries corresponding to said indicia;

a third region grouped with said first and second regions, said third region displaying information regarding one or more categories of said merchantable items and having a portion receiving user input to selectively display further pictorial indicia corresponding to a category of said merchantable items, as directed by user input; and wherein said text entries are stored in said database in a hierarchical category tree.

\* \* \* \* \*